US009748047B2

(12) United States Patent
Vigneras

(10) Patent No.: US 9,748,047 B2
(45) Date of Patent: Aug. 29, 2017

(54) CONNECTOR ARRANGED BETWEEN TWO CYLINDRICAL ENERGY STORAGE ASSEMBLIES

(75) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 45 days.

(21) Appl. No.: 14/241,439

(22) PCT Filed: Aug. 29, 2012

(86) PCT No.: PCT/EP2012/066731
§ 371 (c)(1),
(2), (4) Date: Feb. 26, 2014

(87) PCT Pub. No.: WO2013/030211
PCT Pub. Date: Mar. 7, 2013

(65) Prior Publication Data
US 2015/0022949 A1    Jan. 22, 2015

(30) Foreign Application Priority Data

Aug. 29, 2011  (FR) ..................... 11 57604

(51) Int. Cl.
*H01G 11/82* (2013.01)
*H01G 9/06* (2006.01)
(Continued)

(52) U.S. Cl.
CPC .......... *H01G 11/82* (2013.01); *B23K 20/129* (2013.01); *H01G 2/04* (2013.01); *H01G 9/06* (2013.01);
(Continued)

(58) Field of Classification Search
CPC ........ H01G 11/10; H01G 11/82; H01G 11/58; H01G 11/08; H01G 11/84; H01G 9/06; H01G 9/145; H01G 4/38; H01G 2/04
See application file for complete search history.

(56) References Cited

U.S. PATENT DOCUMENTS 1,723,727 A * 8/1929 Eckstein ................. H01M 6/44
429/158
3,150,300 A     9/1964 Schils et al.
(Continued)

FOREIGN PATENT DOCUMENTS

DE    42 13 651 A1    10/1993
EP    2 110 824 A1    10/2009
(Continued)

OTHER PUBLICATIONS

Non-Final Office Action in U.S. Appl. No. 14/241,441 mailed Nov. 16, 2015. 19 pages.
(Continued)

*Primary Examiner* — David M Sinclair
(74) *Attorney, Agent, or Firm* — Blakely Sokoloff Taylor & Zafman LLP

(57) ABSTRACT

The invention relates to a module comprising at least two electrical energy storage assemblies (20), each storage assembly comprising: a tubular element (21) comprising a so-called side face (23), and at least one cover (50) for covering one of the ends of the tubular element. Said module is characterized in that it also comprises a connecting body (60) for electrically connecting the two assemblies, the connecting body comprising at least one portion, each portion being separate from at least one of the storage assemblies (20), and the connecting body extends between the two storage assemblies such that the height of each storage assembly connected to the connecting body is equal (Continued)

to the height of a storage assembly that does not have a connecting body.

7 Claims, 5 Drawing Sheets

(51) Int. Cl.
    *H01G 9/145*     (2006.01)
    *H01G 11/08*     (2013.01)
    *H01G 2/04*     (2006.01)
    *H01G 11/58*     (2013.01)
    *H01G 11/84*     (2013.01)
    *B23K 20/12*     (2006.01)

(52) U.S. Cl.
    CPC ............ *H01G 9/145* (2013.01); *H01G 11/08* (2013.01); *H01G 11/58* (2013.01); *H01G 11/84* (2013.01); *Y02E 60/13* (2013.01)

(56) References Cited

U.S. PATENT DOCUMENTS

| | | | |
|---|---|---|---|
| 3,386,014 A | | 5/1968 | Burger et al. |
| 4,581,306 A | * | 4/1986 | Hasenauer ............ H01M 2/208 |
| | | | 429/123 |
| 6,456,484 B1 | | 9/2002 | Matsuoka et al. |
| 6,605,382 B2 | | 8/2003 | Ruth et al. |
| 8,568,915 B2 | * | 10/2013 | Fuhr ..................... H01M 2/024 |
| | | | 429/158 |
| 2005/0054240 A1 | * | 3/2005 | Kubota ................ H01M 6/5011 |
| | | | 439/627 |
| 2007/0053140 A1 | | 3/2007 | Soliz |
| 2007/0084043 A1 | | 4/2007 | Hosking |
| 2008/0182168 A1 | * | 7/2008 | Byun .................... H01M 2/204 |
| | | | 429/158 |
| 2009/0104516 A1 | | 4/2009 | Yoshihara et al. |
| 2009/0123830 A1 | | 5/2009 | Kato et al. |
| 2009/0208836 A1 | | 8/2009 | Fuhr et al. |
| 2010/0079927 A1 | | 4/2010 | Shimizu et al. |
| 2011/0038101 A1 | | 2/2011 | Caumont et al. |
| 2011/0081568 A1 | * | 4/2011 | Kim ...................... H01M 2/206 |
| | | | 429/158 |
| 2011/0236733 A1 | | 9/2011 | Lee et al. |
| 2012/0114989 A1 | | 5/2012 | Caumont et al. |
| 2012/0218680 A1 | | 8/2012 | Wetherill et al. |
| 2012/0236466 A1 | | 9/2012 | Iida et al. |
| 2013/0149919 A1 | * | 6/2013 | Lee .......................... H01G 9/26 |
| | | | 439/765 |

FOREIGN PATENT DOCUMENTS

| | | |
|---|---|---|
| FR | 2 894 381 A1 | 6/2007 |
| FR | 2 916 306 A1 | 11/2008 |
| FR | 2 921 195 | 3/2009 |
| FR | 2 921 203 A1 | 3/2009 |
| FR | 2 927 729 | 8/2009 |
| JP | 2000-149907 A | 5/2000 |
| JP | 2003-133715 A | 5/2003 |
| JP | 2004 171856 A | 6/2004 |
| WO | WO-2005061171 A1 | 7/2005 |
| WO | WO 2007/064089 A1 | 6/2007 |
| WO | WO 2010/041461 A1 | 4/2010 |
| WO | WO 2011/111721 A1 | 9/2011 |

OTHER PUBLICATIONS

Search Report in French Application No. 1157605 dated Feb. 29, 2012. 7 pages.

Non-Final Office Action in U.S. Appl. No. 14/241,440, mailed Mar. 21, 2016. 20 pages.

Final Office Action in U.S. Appl. No. 14/241,441 dated Jun. 21, 2016. 17 Pages.

* cited by examiner

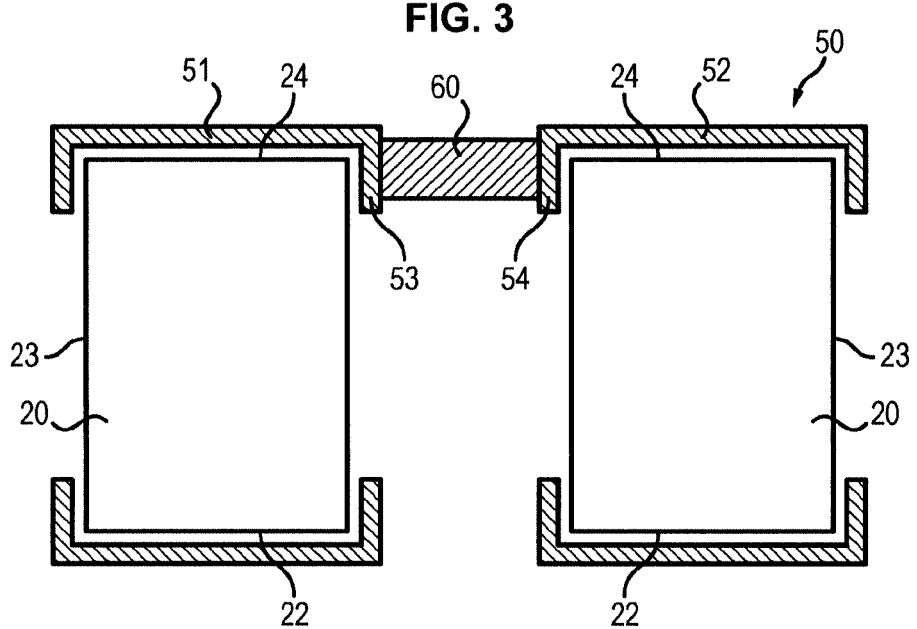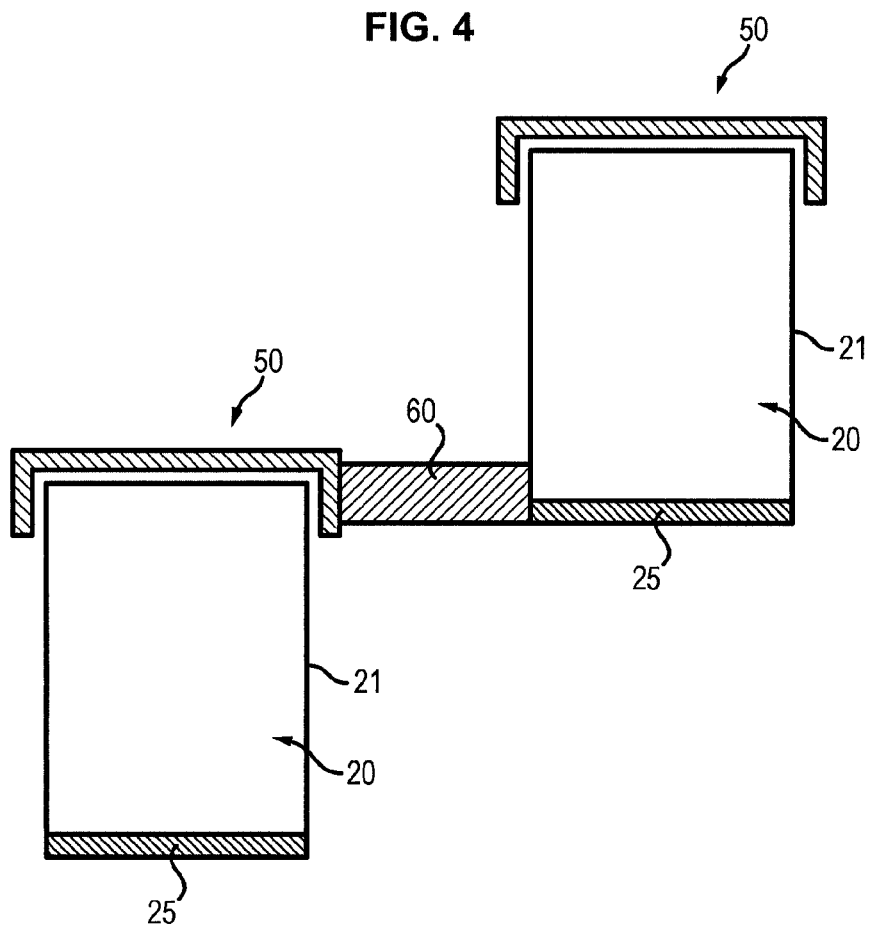

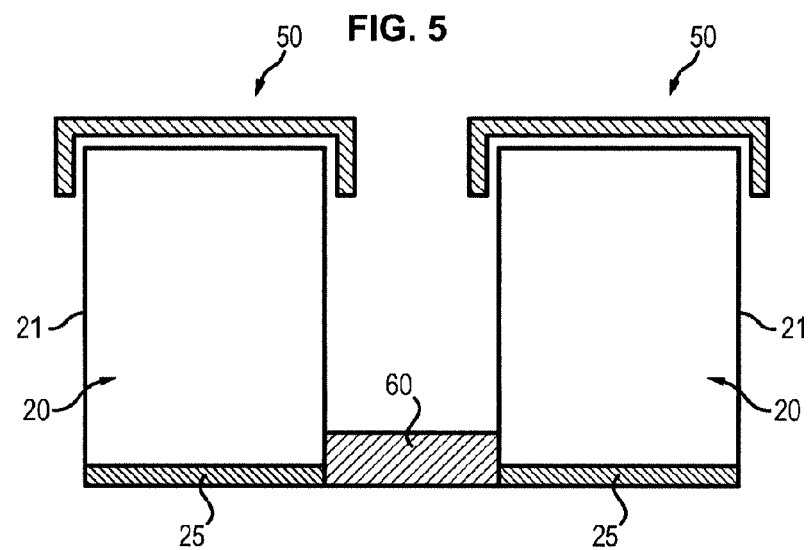
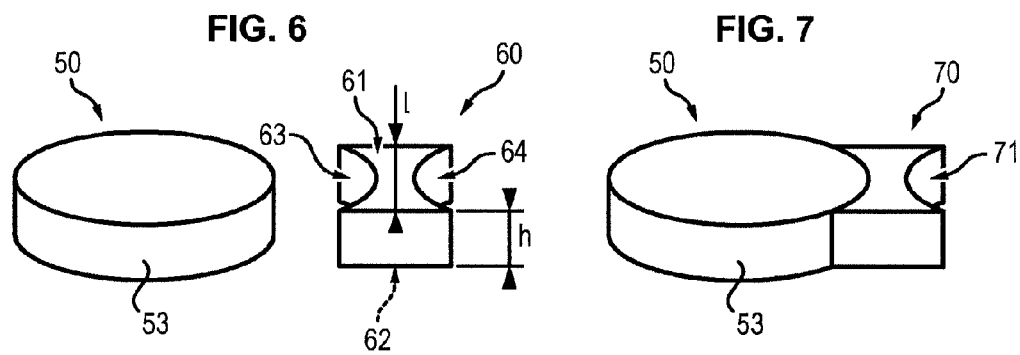
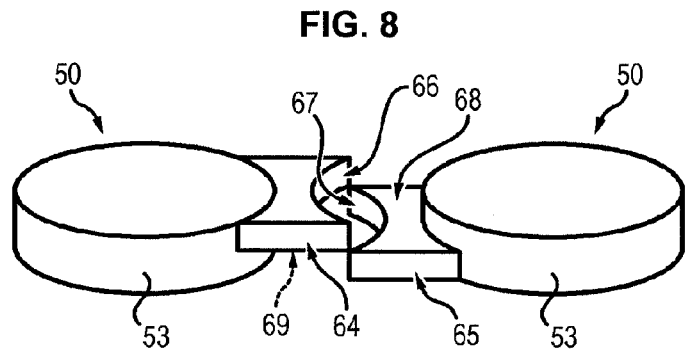

CONNECTOR ARRANGED BETWEEN TWO CYLINDRICAL ENERGY STORAGE ASSEMBLIES

The present invention relates to the general technical field of electrical energy storage assemblies.

More specifically the invention concerns the field of modules comprising at least two electrical energy storage assemblies.

In the present invention by <<electrical energy storage assembly>> is meant either a capacitor (i.e. a passive system comprising two electrodes and an insulator) or a supercapacitor (i.e. a system comprising at least two electrodes, an electrolyte and at least one separator) or a battery of lithium battery type (i.e. a system comprising at least one anode, at least one cathode and an electrolyte solution between the anode and the cathode).

GENERAL PRESENTATION OF THE PRIOR ART

Modules are known such as those illustrated in FIG. 1 comprising a casing 110 in which several electrical energy storage assemblies 120 are arranged.

Each storage assembly is of tubular supercapacitor type for example.

It comprises a casing such as a tubular element, a capacitive winding and a liquid electrolyte inside the housing. The storage assembly also comprises two covers to close the two ends of the housing. Each cover 130 is electrically connected to the capacitive winding.

Inside the module the storage assemblies 120 are alternately connected in pairs at their upper and lower ends via connector strips 140.

Each cover 130 comprises a connection terminal 131 capable of coming into contact with a bore passing through the connector strip 140.

The connection of the covers 130 with the connector strip 140 of two adjacent storage assemblies 120 can be obtained by press-fitting the strip 140 onto the connection terminals 131 of the covers 130, by laser or other welding edge to edge between the strip 140 and the terminals 131, by screwing or using a combination of these different techniques.

However, these connection techniques between strip and cover (i.e. press-fitting or welding or screwing) first require narrow tolerances of the terminals and strips and secondly require precise aligning of the parts with each other to ensure an end module of quality and hence of high manufacturing cost.

Modules are also known in which the storage assemblies are connected in pairs using a longitudinal part in a single piece—called a bi-cover—forming both a cover and a connector strip. Said longitudinal piece is notably described in document FR 2 894 381.

The use of a bi-cover for the electrical connection of two adjacent storage assemblies allows an increase in the electrical and thermal performance of the modules. More specifically:

regarding electrical performance, the use of a single unit bi-cover (i.e. an element in a single, piece having the functions of cover and strip) allows a reduction in the internal resistance of the connection means: for the connection of two storage assemblies using a connector strip, the electric current is compelled to pass through weld regions of limited size;

regarding thermal performance, the use of a single unit bi-cover allows an increase in the contact surface between the energy storage assemblies and the walls of the module which promotes heat diffusion towards the upper part 111 of the casing 110.

However, it is not possible to use solely bi-covers to connect together all the storage assemblies of a module. This would effectively require the impregnation of the assemblies after completing the assembling of the module since the bi-cover which allows this assembling is also used to ensure the sealing of each of the assemblies. This makes the process most complex. It is therefore necessary, in addition to the use of bi-covers, to use connector strips and standard covers for the electrical connecting together of the storage assemblies. For example, the bi-covers are used for the electrical connection of the bottom surfaces of the different storage assemblies, and covers and strips illustrated in FIG. 1 for the electrical connection of the top surfaces of these storage assemblies.

Assembling is therefore complex due to the need to use three types of different parts (i.e. cover, strip and bi-covers).

In addition this solution does not allow optimized compactness of the module obtained on account of the presence of the covers and strips illustrated in FIG. 1 on one surface of the storage assemblies.

It is one object of the present invention to propose a solution to the assembling problems of the aforementioned modules, namely a technical solution allowing more compact assembling of modules, this assembling being easier to implement than the prior art solutions.

PRESENTATION OF THE INVENTION

For this purpose, a module is provided comprising at least two electrical energy storage assemblies, each storage assembly comprising:
  a tubular element having a so-called side face;
  at least one cover intended to cap one of the ends of the tubular element, the cover comprising a covering wall intended to cover said end of the tubular element,
noteworthy in that the module further comprises a connecting body intended to connect the two assemblies electrically, the connecting body comprising one or more portions, each portion being separate from at least one of the storage assemblies, the connecting body extending between the two storage assemblies so that the height of each storage assembly connected to the connecting body is equal to the height of a storage assembly not having a connecting body (i.e. not connected to the connecting body).

In the present invention by <<separate from at least one cover>> is meant the fact that each portion of the connecting body is not in a single piece with both covers at the same time.

In the present invention by <<capping>> is meant the shutting/closing of the end of the tubular element for example by:
  covering the end of the tubular element with a cover comprising an annular peripheral skirt, the cover having a larger diameter than the diameter of the tubular element;
  pressing into the tubular element via its end, a cover having a diameter smaller than the diameter of the tubular element, the axes of revolution of the cover and of the tubular element being coaxial.

The height of the storage assembly corresponds to the dimension of this assembly along the axis of the tubular element.

Preferably, the term main direction is given to the direction in which the two storage assemblies are joined together, and the connecting body extends between the storage assemblies so that, in a secondary direction perpendicular both to the direction of the axis and to the main direction, the dimension of each storage assembly connected to the connecting body is equal to the dimension in this direction of a storage assembly devoid of any connecting body (i.e. not connected to the connecting body).

In other words, the dimension in the secondary direction of the two joined storage assemblies provided with the connecting body is equal to the dimension in this direction of the storage assembly having the greatest dimension. In the ideal case in which there is no dispersion between the dimensions of the assemblies, the dimension of the joined assemblies in this direction is equal to the dimension of one assembly.

In this manner, the volume of the joined assemblies is minimized also in this direction and it is possible to maximize the volume capacity of the energy storage module.

In one particular embodiment, the height of the two joined storage assemblies provided with the connecting body is equal to the height of the storage assembly of greatest height. In the ideal case, in which there is no dispersion between the dimensions of the assemblies, the height of the joined assemblies is equal to the dimension of one assembly. This embodiment corresponds to the configuration in which the connecting body joins together two identical ends (upper or lower) of the assemblies and in which the two assembled assemblies are therefore placed on one same level of the module.

In another embodiment, the connecting body may also join together an upper end of one assembly with the lower end of another assembly. In this case, the height of the joined assemblies is shorter than the sum of the heights of the assemblies. This embodiment corresponds to the configuration in which the two joined assemblies are not placed on one same level of the module.

Other preferred but non-limiting aspects of the module according to the invention are the following:
  the connecting body is intended to be in contact with:
    the cover of at least one of the storage assemblies and/or
    the tubular element of at least one of the storage assemblies
  to connect the connecting body electrically with the storage assemblies;
  the connecting body comprises at least one contact face intended to come into contact with the cover or with the tubular element of at least one of the storage assemblies, the shape of the contact face mating with the shape of the cover or tubular element;
  the contact face is concave for example. Its shape therefore mates with the shape of a cylindrical assembly. The contact face may be any other shape however;
  the connecting body comprises a cradle intended to be secured by interlocking for example onto a support of one of the storage assemblies, the cradle and the support having matching shapes;
  the cradle comprises a tenon or mortise and the support comprises a mortise or tenon;
  the connecting body is separate from the two storage assemblies, the connecting body comprising two contact faces, each contact face preferably having a profile matching the profile of the cover and/or of the tubular element with which said face is intended to come into contact;
  the connecting body comprises a tongue in a single piece with one of the assemblies in particular with a cover, which facilitates the assembly method;
  the height of the contact face is equal to the height of a cover, to maximize the contact surface between the connecting body and said cover. However the contact face may also be less high than the cover;
  the connecting body comprises two tongues each forming a portion of the connecting body, each tongue being in a single piece with a respective assembly, a cover in particular, said tongues being positioned on the assemblies so that they are superimposed during the electrical connection of said assemblies. This embodiment facilitates the assembling method since it only requires the implementing of a single connecting step (between the two portions of the connecting body) whilst making the connection simpler since the configuration of the connecting surface is not imposed by the shape or position of the cover or of the tubular element;
  it is noted that the tongues of the two assemblies may be of different thickness. One of the tongues forming the connecting body—for example the tongue the furthest away from the covering walls of the covers—may be thicker than the other of the tongues forming the connecting body, which can facilitate the joining of the two tongues irrespective of the type of chosen joining, in particular when this joining uses welding e.g. friction stir welding;
  if one of the covers comprises a connecting tongue, the corresponding tubular element may have a cut-out matching the cross-section of the tongue, which allows the tongue to be left to protrude from the assembly and come into contact with the other assembly, even if provision is made for the cover to be pressed inside the tubular element;
  the cover of at least one assembly may also comprise a peripheral skirt extending over the periphery of the covering wall of the cover and being intended to surround the side face of the tubular element, in this case a tongue of the connecting body can be arranged on the skirt and extend for example outwardly perpendicular to the peripheral skirt. It will be noted that this embodiment and the preceding embodiment can be combined, the configuration of the different covers of the module not necessarily being identical;
  each portion of the connecting body is connected to the assembly or to the assemblies from which it is separate by welding, preferably friction stir welding. This type of weld is easy to recognise on the finished part since the trace of the tool rotating at the interface of the two parts can be seen (the material having solidified in this way).

The invention also concerns a method for assembling a module comprising at least two electrical energy storage assemblies, each storage assembly comprising:
  a tubular element comprising a so-called side face;
  at least one cover intended to cap one of the ends of the tubular element, the cover comprising a covering wall intended to cover said end of the tubular element,
the method being noteworthy in that it comprises a positioning and contacting step of at least one portion of a connecting body, said body comprising at least one portion, each portion being separate from at least one assembly so as to join together the two storage assemblies to connect them electrically, the connecting body being positioned between the two storage assemblies so that the height of the storage assembly connected to the connecting body is equal to the height of a storage assembly devoid of a connecting body.

Preferred but non-limiting aspects of the assembling method according to the invention are the following:
- the method further comprises a step to secure each portion of the connecting body so as to connect it to the storage assembly or assemblies from which it is separate;
- the securing step is a welding step in particular by friction stir welding.

PRESENTATION OF THE FIGURES

Other characteristics, objectives and advantages of the present invention will become better apparent from the following description which is solely illustrative and non-limiting and is to be read in connection with the appended drawings in which:

FIGS. 3 to 5 illustrate different examples of the positioning of a connecting body according to the invention;

FIGS. 6 to 9 illustrate different embodiments of the connecting body according to the invention;

DESCRIPTION OF THE INVENTION

A description will now be given of different embodiments of the module according to the invention with reference to the Figures. In these different Figures equivalent elements of the module carry the same reference numbers.

Figure 2:
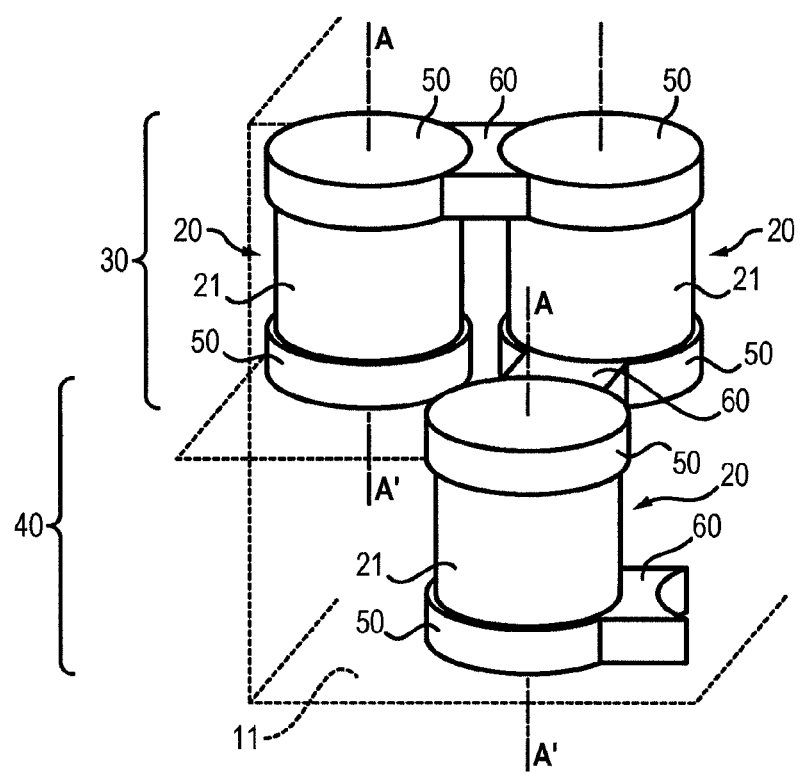
FIG. 2 illustrates an example of a module according to the invention.

As illustrated in FIG. 2, the module 1 comprises a casing 10 in which there are arranged at least two electrical energy storage assemblies 20. More specifically the module comprises three storage assemblies arranged on several levels.

The storage assemblies 20 are of globally cylindrical shape. In other variants not illustrated herein the storage assemblies may be of parallelepiped, cubic, oval, hexagonal shape without this changing the general principles of the invention.

A first level 30 of the module comprises two storage assemblies 20 arranged side by side in the casing 10. A second level 40 of the module comprises a third energy storage assembly 20.

The axes of revolution A-A' of the storage assemblies 20 are parallel. In the embodiment illustrated in FIG. 2, the storage assemblies 20 are arranged so that their axes of revolution A-A' are perpendicular to the lower wall 11 of the casing 10.

Each storage assembly 20 comprises a tubular element 21 and a capacitor element (not illustrated) in the tubular element 21.

The constituent material of the tubular element 21 may be electrically insulating—e.g. in plastic—or electrically conductive e.g. in metal such as aluminium, stainless steel, etc.

The tubular element 21 may be open at its two ends or it may have a bottom. In the embodiment illustrated in FIG. 2, each tubular element 21 comprises two openings on its upper and lower faces.

Each open face of the tubular element 21 is capped by a cover 50 electrically connected to the electrical storage assembly 20 along weld generating lines. The cover 50 is electrically conductive. The constituent material of the cover 50 is a metal for example such as aluminium, stainless steel, etc.

Each cover 50 is composed of:
- a covering wall 51, 52 intended to cover the upper 24 (respectively lower 22) face of its associated storage element 20, and
- a peripheral skirt 53, 54 intended partly to surround the side face 23 of the tubular element 21.

Figure 1:
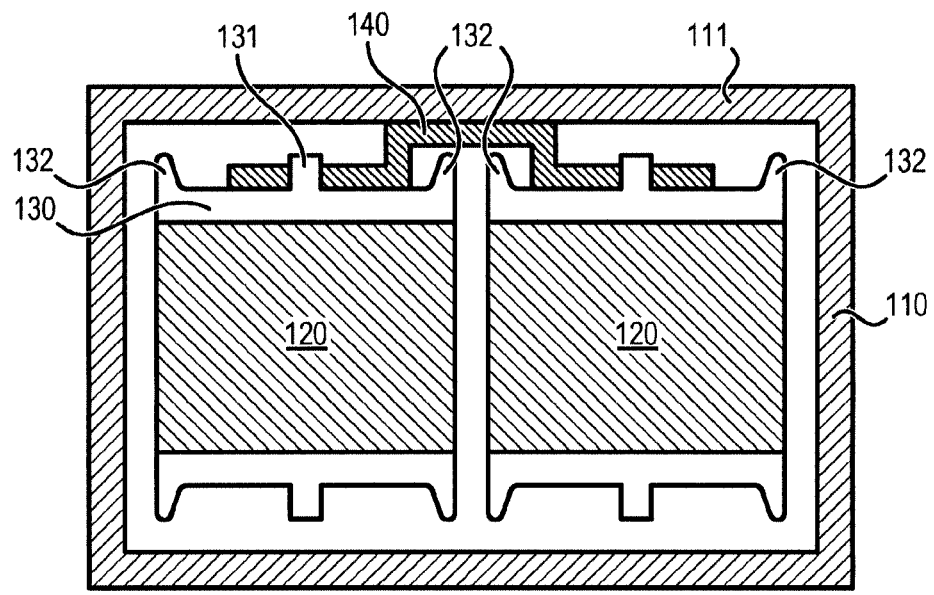
FIG. 1 illustrates an embodiment of a prior art module.

Each cover 50 may or may not comprise a peripheral edge (such as the peripheral edge 132 illustrated in FIG. 1) extending outwardly parallel to the axis of revolution A-A' of the storage assembly on its surface opposite the peripheral skirt.

The module also comprises three connecting bodies 60 which will be described in more detail below.

One particular aspect of the module according to the invention is that the connecting body 60 and the covers 50 are connected via welding at the skirt 53, 54 of each cover 50. The welding technique may be transparent laser or edge-to-edge laser welding, or preferably Friction Stir Welding (FSW).

By transparent laser welding is meant the fact that two superimposed parts are welded with an energy beam passing through one of the parts to be welded—either through a thinned portion thereof if the part is thick or through the entire thickness if the part is thin.

By edge-to-edge laser welding is meant the fact that two parts positioned edge to edge are welded using an energy beam that is not a through beam but is adjusted to the shape of the edges to be welded and positioned with precision at the interface of the edges to be welded.

With reference to FIGS. 3 and 4 different examples of the connection of two adjacent storage assemblies 20 are illustrated using a connecting body 60. In these embodiments, the connecting body 60 is advantageously positioned between the storage assemblies 20 so that the height of the storage assembly connected to the connecting body is equal to the height of a storage assembly not connected to a connecting body.

The connecting body 60 is electrically conductive. The constituent material of the connecting body 60 is a metal for example such as aluminium, copper, etc.

In the embodiment shown FIG. 3, the connecting body 60 is in contact with the upper covers 50 of the storage assemblies 20 to be electrically connected. More specifically the connecting body 60 is in contact with the covers 50 at their respective skirts 53, 54.

Therefore, contrary to the prior art modules, two adjacent storage assemblies 20 are not connected using a connector strip 131 arranged ON the covers 50 but using a connecting body 60 arranged BETWEEN the covers.

More specifically, the connecting body 60 is in contact:
- with the covers at their peripheral skirt, and/or
- with the tubular elements of the storage elements at their side wall 23.

This makes it possible to minimize the height of two adjacent electrically connected storage assemblies and hence to maximize the compactness of the module thus obtained.

If the body allows two identical ends to be connected (upper or lower) of one same assembly as is the case for the two assembles in FIG. 3, positioned at the same level 30 of the module, the height of the two joined assemblies is equal to the height of each assembly (in the ideal case in which the assemblies have the same dimensions).

In the embodiment illustrated in FIG. 4, the tubular element 21 of each storage assembly 20 comprises a bottom 25. Each storage assembly 20 comprises a single cover 50 intended to cap the open upper face of the tubular element 21. The connecting body 60 is in contact with the upper cover 50 of a storage assembly 20 and with the lower part of the tubular element 21 of an adjacent storage assembly.

If the body allows the connecting of an upper end of one assembly and the lower end of another assembly as is the case in FIG. 4, for assemblies belonging to two different levels 30, 40 of the module, the height of the two joined assemblies is shorter than the sum of the heights of the assemblies.

As a variant, the connecting body 60 may be in contact with the tubular elements of two adjacent storage assemblies as illustrated in FIG. 5.

Other configurations could also be envisaged in which for example the body connects one end of one assembly with a median part of another assembly.

It will be noted that the connecting body is configured in each of the cases illustrated herein so that the bulk of the two joined assemblies joined via this body is minimal, both in height and in width (namely in a direction perpendicular to the axis of the assemblies and to the direction connecting these axes). The body is effectively configured so that in this direction the dimension of the two joined assemblies is equal to the dimension of one assembly if the ideal case is considered in which all the assemblies have the same dimensions. In other words, the dimension of the connecting body does not exceed the diameter of the assembly.

With reference to FIG. 6 one embodiment of the connecting body of the invention is illustrated.

The connecting body 60 comprises upper and lower planar faces 61, 62. The connecting body 60 can be positioned so that the upper face 61 thereof (respectively lower face 62) extends along one same plane as the upper (respectively lower) face of a storage assembly.

Depending on the configurations of possible connection between the connecting body and the storage assembly, this upper (respectively lower) face of the storage assembly may be:
 the surface of the covering wall 51, 52 opposite the skirt 53, 54 of a cover 50, or
 the outer surface of the bottom of a tubular element 21.

The connecting body 60 also comprises two opposite-facing side faces 63, 64 (called <<contact faces>> in the remainder hereof) intended to come into contact with the skirt 53, 54 of a cover 50 of with the side face 23 of a tubular element 21.

In the embodiment illustrated in FIG. 6 each contact face 63, 64 is concave and has a profile substantially in an arc of a circle along a cross-section parallel to the upper face 61 of the connecting body 60. Therefore the shape of the contact face matches the shape of the skirt of the cover or of the tubular element on which it is intended to be secured, and the contact surface between the assembly and the connecting body is maximized. This makes it possible to increase the contact surface between the connecting body 60 and the storage assemblies 20 and hence to reduce the electrical resistance of the module.

To maximize this contact surface between the connecting body 60 and the storage assemblies 20 whilst minimizing the bulk of the module:
 the height of each contact face 63, 64 can be chosen to be equal to the height h of the skirt 53, 54 of a cover 50, and/or
 the width w of the connecting body 60 can be chosen to be equal to the diameter of the tubular element 21 or of the cover 50 with which said body is intended to come into contact The reader will appreciate that the contact face(s) 63, 64 of the connecting body 60 may have profiles other than a profile in an arc of a circle.

For example each contact face 63, 64 of the connecting body 60 may have a dove-tailed or serrated profile etc.

In addition, each contact face 63, 64 of the connecting body may comprise a male-shaped (respectively female-shaped) cradle intended to be secured onto a support of female (respectively male) shape of the storage assembly.

It is thereby mechanically possible to secure the connecting body onto the storage assembly either by interlocking or by press-fit or any other type of mechanical fastening known to persons skilled in the art. For example the cradle of the contact face may comprise a tenon (respectively a mortise) and the support of the storage assembly may comprise a mortise (respectively a tenon).

With reference to FIG. 7 an illustration is given of another embodiment of the connecting body 60. In this embodiment, the connecting body 60 and a cover 50 are a single unit i.e. the cover 50 and the connecting body 60 are made in a single piece.

The cover 50 comprises an annular peripheral skirt 53 and a radial tongue 70 on the annular peripheral skirt 53. The radial tongue 70 comprises four substantially planar surfaces and a contact face 71 opposite the cover 50.

The contact face 71 is intended to come into contact with the cover 50 or the tubular element 21 of an adjacent storage assembly 20.

The contact face 71 may have a shape which mates with the cover 50 or the tubular element 21 with which it is intended to come into contact e.g. a concave shape.

As for the connecting body 60 illustrated in FIG. 6, the dimensions of the radial tongue 70 can be chosen to maximize the contact surface between the radial tongue 70 and the storage assembly 20 with which said tongue is intended to come into contact; in particular:
 the height h of the contact face 71 may be equal to the height of a skirt 53; and/or
 the width w of the contact face 71 may be equal to the diameter of the tubular element or of the cover with which said tongue is intended to come into contact.

With reference to FIG. 8 a third embodiment of the connecting body is illustrated. In this embodiment each cover 50 comprises a radial tongue 64, 65 extending outwardly from the annular peripheral skirt 53, parallel to the upper surface of the cover. The radial tongue of each cover forms a portion of the connecting body. Each of the tongues 64, 65 comprises a concave contact face 66, 67 opposite the cover 50. This contact face 66, 67 is intended to come into contact with the cover of an adjacent storage assembly. The height of the radial tongue is equal to or shorter than one half of the height of the skirt.

One first type of cover comprises a flush radial tongue 64 (i.e. extending in the continuation of the covering wall of the cover 50).

A second type of cover comprises a radial tongue 65 extending at the free end of the annular peripheral skirt 53, parallel to the covering wall 51, 52 of the cover 50. Therefore the shapes of the two types of covers are matching shapes. To connect two adjacent storage assemblies electrically, a cover of the first type is used on one of the two storage assemblies, and a cover of the second type on the other storage assembly. These covers are positioned so that the radial tongues of the covers of the first and second type are superimposed, the lower surface 69 of the upper tongue 64 resting on the upper surface 68 of the lower tongue 65.

By superimposing the radial tongues it is possible to facilitate the welding operation. Advantageously, the radial tongues 64, 65 can be welded together at the surfaces 68, 69.

It will be noted that the thickness of the lower tongue 65 is preferably greater than the thickness of the upper tongue 64. In this case it may form a support allowing the welding of the tongues 64, 65 without damaging the connecting body.

It is thereby possible to maximize the exchange surface between the radial tongues 64, 65 and hence to minimize the electrical resistance of the connecting body.

Figure 9:
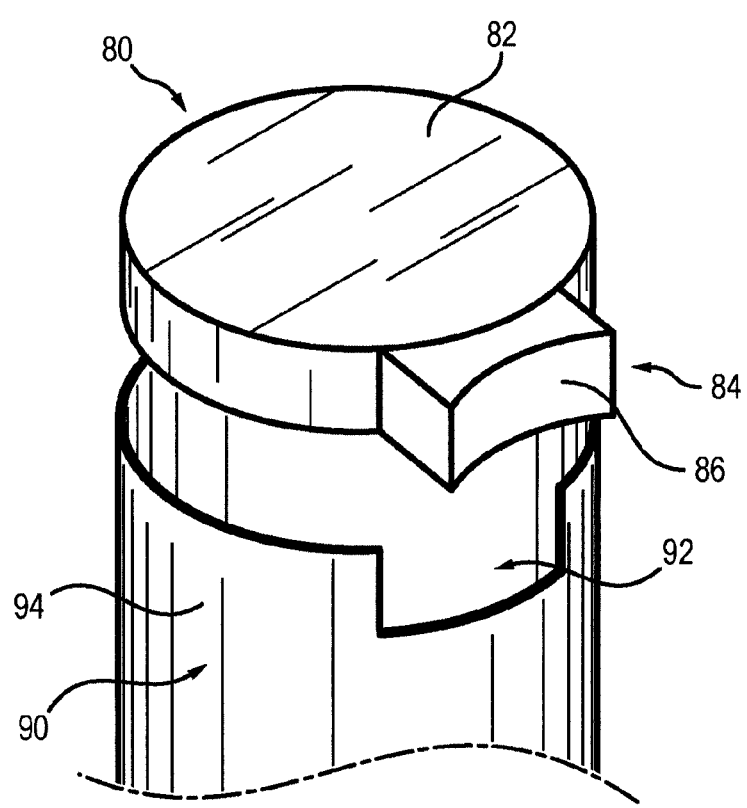
Figure 10:
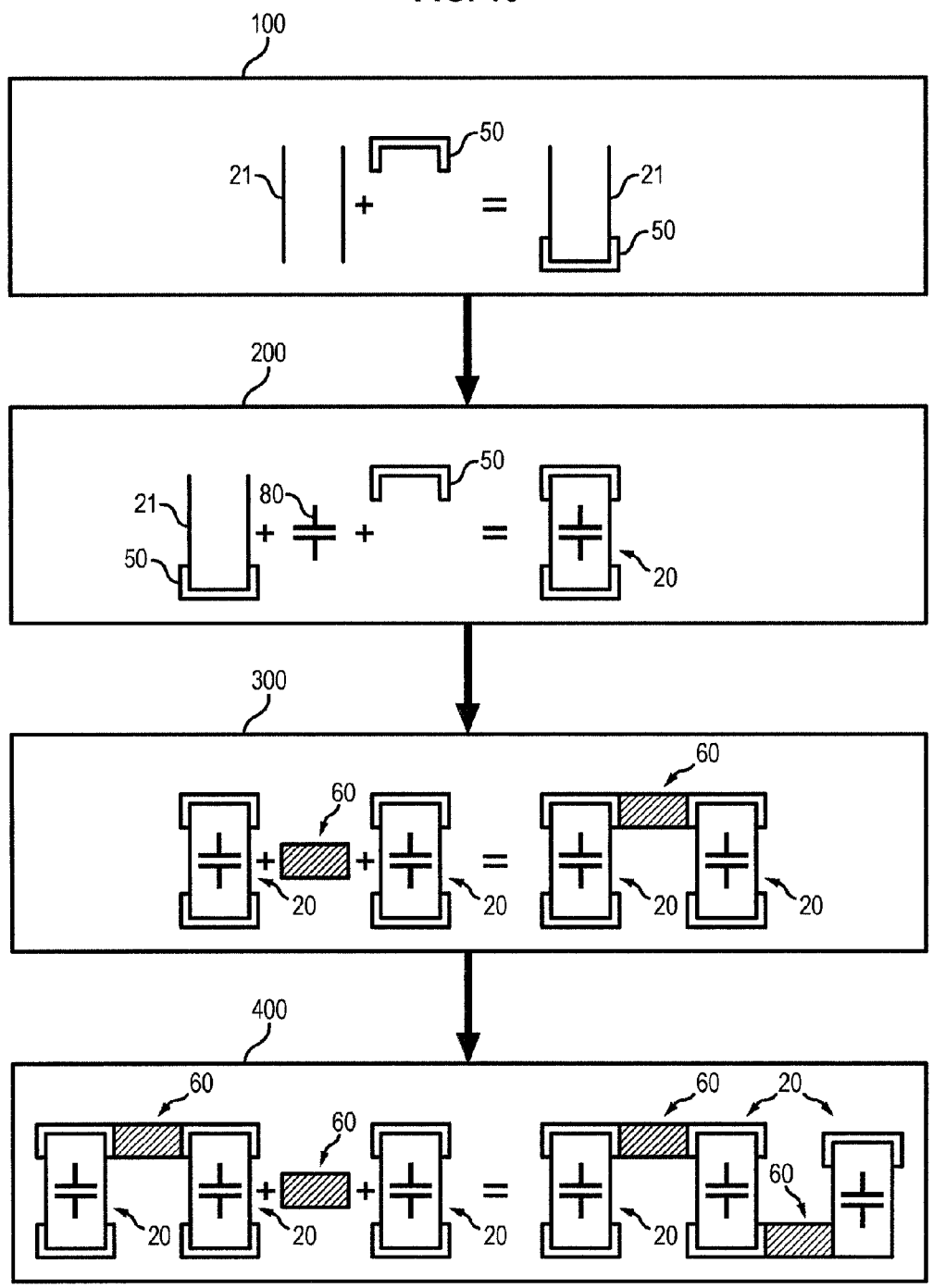
FIG. 10 illustrates an example of a method for assembling modules according to the invention.

Another variant of embodiment of the invention is also illustrated in FIG. 9. In this Figure, the cover 80 has a shape that differs from everything described previously. Indeed, the cover is formed of an essentially planar disc 82 and does not comprise a peripheral skirt. The dimensions of the disc 82 are smaller than the dimensions of the end of the tubular elements 90, and it is therefore inserted into the tubular element so that the upper surface of the cover 80 lies flush with the end of the tubular element.

The cover also comprises a radial tongue 84 whose height is equal to the height of the disc 82. The tongue 84 comprises a contact face 86 intended to be connected to a second assembly as described previously.

It is also noted that the tubular element 90 comprises a cut-out 92 in its side wall 94 allowing the radial tongue to project from the tubular element 90 and to connect the assembly to a second adjacent assembly.

It will be noted that the shape of the cover described with reference to FIG. 9 can be adopted even if the tubular element does not comprise a cut-out. In this case the cover is placed on the end of the tubular element.

To summarize and with reference to FIGS. 6 to 9, the connecting body can be made in one (FIG. 6, 7 or 9) or two parts (FIG. 8) one and/or the other of these parts possibly being in a single piece with one of the covers (FIGS. 7 to 9).

However, irrespective of the configuration of the connecting body, it is never in a single piece with two covers at the same time. This allows improved flexibility for assembling of the module.

A more detailed description will now be given of an example of method.

If the tubular element 21 does not comprise a bottom, a cover 50 is arranged on one of the faces of the tubular element (step 100).

A capacitor element 80 is positioned inside the tubular element 21. A cover 50 is placed on the open end of the tubular element (step 200) then, once the connection between the tubular element 21 and the cover 50 has been sealed, the electrolyte is placed in the tubular element.

A first electrical energy storage assembly is thereby obtained. These steps are repeated to obtain the number of desired storage assemblies for the module.

At a step of the assembling method, two energy storage assemblies are positioned side by side.

A connecting body 60 is positioned between the two energy storage assemblies. This connecting body 60 is placed in contact with the skirts of the two energy storage assemblies 20 for the electrical connection thereof. Advantageously, the connecting body is positioned so that the height of the storage assembly connected to the connecting body is equal to the height of a storage assembly not connected to the connecting body.

The connecting body is secured onto the two storage assemblies (300). This securing can be obtained by gluing, screwing, welding or interlocking of mating parts provided on the covers and on the connecting body. Welding and in particular friction stir welding is the preferred embodiment since it allows better passing of current.

These different steps can be repeated (step 400) to connect a plurality of storage assemblies electrically to form modules having different properties in relation to the intended application.

The assembling of a module using the connecting body described above has numerous advantages:

- the different configurations of the connecting body allow good flexibility of two joined adjacent storage assemblies, at different heights and at different angles, since the connecting body is not in a single piece with the covers of both storage assemblies;
- the joining of two storage assemblies can be obtained using standard parts (cover and connecting body) irrespective of the joining configuration of the adjacent storage assemblies (storage assemblies positioned on different levels and/or at different angles etc.);
- since the parts used for joining (connecting body, cover etc.) are of simple, standard shape the manufacturing costs thereof (and hence of the module) are low;
- the connecting bodies allow maximized compactness of the module;
- the use of a connecting body also allows improved heat evacuation; in the prior art modules in which a strip is superimposed over the cover, heat is only evacuated via the weld beads connecting the strip to the cover; on the contrary, with the use of a connecting body, heat is evacuated through the entire upper surface of the cover which is directly in contact with surrounding air;
- finally, the use of a connecting body according to the invention allows a reduction in the resistance of the module, the distance covered by the electric current in a module according to the invention being shorter than the distance traveled by the electric current in a module whose assemblies are connected via a connector strip superimposed over the cover.

The reader will have understood that numerous modifications can be made to the method and device described in the foregoing without departing in substance from the novel teachings and advantages described herein.

In particular the tubular element, the cover or the connecting body can be of different shapes to those illustrated in the Figures. For example, the connecting body may be a rod or may comprise a contact face whose shape does not match the shapes of the assembly.

Therefore, any modifications of this type come within the scope of the module of the invention such as defined in the appended claims.

The invention claimed is:

1. A module comprising at least two electrical energy storage assemblies, each storage assembly comprising:
   a tubular element having a so-called side face;
   a cover intended to cap one of the ends of the tubular element, the cover comprising a covering wall and a peripheral skirt, said covering wall being intended to cover said end of the tubular element, each said tubular element having a corresponding one of said covers, wherein the module further comprises a connecting body intended to connect two assemblies electrically, the connecting body being in one portion, and comprising two opposite-facing side contact faces of concave shape, each contact face having a profile mating with the profile of the skirt of the cover or with the profile of the side face of the tubular element with which said contact face is intended to come into contact, the connecting body being secured along its two contact faces to the skirt of the cover or to the side face of the tubular element of the two storage assemblies by welding, the connecting body extending between the two storage assemblies so that the height of each storage assembly connected to the connecting body is equal to the height of a storage assembly not having a connecting body.

2. The module according to claim 1, wherein the connecting body extends between the two storage assemblies so that the height of the two joined assemblies is equal to the height of the assembly having the greatest height.

3. The module according to claim 1, wherein a main direction is a direction joining the axes of the two tubular elements once the assemblies have been joined, the connecting body extending between the storage assemblies so that in a secondary direction perpendicular both to the direction of the axes of the tubular elements and to the main direction, the dimension of the two joined storage assemblies provided with the connecting body is equal to the dimension in the direction of the storage assembly having the largest dimension.

4. The module according to claim 1, wherein the connecting body is connected by friction stir welding to the two electrical energy storage assemblies.

5. The module according to claim 1, wherein the connecting body comprises upper and lower planar faces and two opposite facing side contact faces, each of which being concave and having a profile substantially in an arc of a circle along a cross section parallel to said upper face.

6. A method for assembling a module comprising at least two electrical energy storage assemblies, each storage assembly comprising:
a tubular element having a so-called side face;
a cover intended to cap one of the ends of the tubular element, the cover comprising a covering wall and a peripheral skirt, the covering wall being intended to cover said end of the tubular element, each said tubular element having a corresponding one of said covers wherein the method comprises a step consisting in positioning a connecting body between the two storage assemblies so as to join the two storage assemblies for the electrical connection thereof, said connecting body being in one portion and comprising two concave opposite-facing side contact faces, each contact face having a profile mating with the profile of the skirt of the cover or with the profile of the side face of the tubular element with which said contact face is intended to come into contact, the connecting body being positioned between the two storage assemblies so that the height of the storage assembly connected to the connecting body is equal to the height of a storage assembly not having a connecting body, wherein the method further comprises a welding step of the connecting body so as to connect it to the two storage assemblies from which it is separate.

7. The method according to claim 6, wherein the welding step is a friction stir welding step.

* * * * *